(12) United States Patent
Williams

(10) Patent No.: US 8,757,027 B2
(45) Date of Patent: Jun. 24, 2014

(54) REDUCED MASS CRANKSHAFT

(75) Inventor: Rick L. Williams, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 347 days.

(21) Appl. No.: 12/873,577

(22) Filed: Sep. 1, 2010

(65) Prior Publication Data
US 2012/0048226 A1    Mar. 1, 2012

(51) Int. Cl.
*F02B 75/06* (2006.01)

(52) U.S. Cl.
USPC ............................. 74/603; 123/192.2

(58) Field of Classification Search
USPC ............... 74/595, 596, 603, 604; 123/192.1, 123/192.2
IPC ...... F16C 3/20; F02B 75/06,75/20; F16F 15/28
See application file for complete search history.

(56) References Cited

U.S. PATENT DOCUMENTS

| | | | |
|---|---|---|---|
| 1,512,479 A * | 10/1924 | Oldson | ............................ 74/603 |
| 1,645,717 A | 10/1927 | Oldson | |
| 3,045,507 A | 7/1962 | Turlay | |
| 4,509,378 A | 4/1985 | Brown | |
| 4,632,072 A | 12/1986 | Brogdon | |
| 4,730,512 A | 3/1988 | Ito et al. | |
| 4,833,940 A * | 5/1989 | Ito | ................... 74/595 |
| 5,481,942 A * | 1/1996 | Baek | .............. 74/603 |
| 6,164,259 A | 12/2000 | Brogdon et al. | |
| 6,772,654 B1 * | 8/2004 | Cobble | .......... 74/595 |
| 7,234,432 B2 * | 6/2007 | Nagira | ....... 123/192.2 |
| 7,367,303 B2 * | 5/2008 | Yamamoto et al. | ........ 123/192.1 |
| 7,584,738 B2 | 9/2009 | Stott et al. | |
| 2002/0038644 A1 | 4/2002 | Korenjak | |
| 2008/0115757 A1 | 5/2008 | Quiring et al. | |
| 2010/0043739 A1 * | 2/2010 | Jang | ........................ 123/192.2 |

FOREIGN PATENT DOCUMENTS

| | | |
|---|---|---|
| DE | 746510 | 5/1943 |
| GB | 2092235 A * | 8/1982 |

OTHER PUBLICATIONS

ISA European Patent Office, Search Report of EP11179116, Apr. 16, 2012, Germany, 42 pages.

* cited by examiner

*Primary Examiner* — Thomas Diaz
(74) *Attorney, Agent, or Firm* — Julia Voutyras; Alleman Hall McCoy Russell & Tuttle LLP

(57) ABSTRACT

A crankshaft for an engine having an odd number of cylinders is provided. In one example, the crankshaft includes a central pin coupling a first and a second asymmetric counterweight and a pair of pins coupling cheeks absent counterweights. The crankshaft can improve engine balance at least during some conditions.

21 Claims, 8 Drawing Sheets

REDUCED MASS CRANKSHAFT

BACKGROUND/SUMMARY

It may be desirable to reduce the mass and rotational inertia of the crankshaft in a vehicle to increase the vehicle's efficiency. Further, the engine may be able to rotate at higher engine speeds when rotational inertia of the crankshaft is reduced. However, when the mass and rotational inertia of the crankshaft are reduced, fundamental design characteristics such as crankshaft balance and load capacity may be compromised. Furthermore, the crankshaft's ability to convert reciprocating forces from pistons and connecting rods into rotational forces may be diminished when the mass of the crankshaft is reduced. Consequently, the operational life cycle of a crankshaft may be reduced when crankshaft mass is reduced. Further, engine noise, vibration, and harshness (NVH) may also degrade when crankshaft mass is reduced.

A crankshaft for a V-6 engine is disclosed in U.S. Pat. No. 4,730,512. In particular, a crankshaft having a reduced number of counterweights is described. The crankshaft balance is purportedly maintained by adjusting positions of the remaining counterweights. The Inventor has recognized various shortcomings with the aforementioned crankshaft. For example, the alignment and distribution of the counterweights disclosed in U.S. Pat. No. 4,730,512 cannot be applied to other engine configurations such as inline or flat cylinder configurations.

As such, various example systems and approaches are described herein. In one example, a crankshaft for an engine is provided. The crankshaft including a central pin coupling a first and second counterweight, each counterweights being asymmetric with respect to a plane radially aligned with a central axis of the central pin and a rotational axis of the crankshaft. The central pin located between the first set of outer pins, a first outer pin of the first set of outer pins coupling a first pair of cheeks, and a second outer pin of the first set of outer pins coupling a second pair of cheeks.

In this way, the mass of a crankshaft may be reduced as compared to crankshafts having one or more counterweights corresponding to each engine cylinder. The described crankshaft may be particularly useful for inline engines because fundamental design characteristics may be maintained. For example, since the crankshaft is well balanced, the engine may be able to operate at higher speeds. Further, since crankshaft balance is achieved without reducing the mass of load bearing portions of the crankshaft, the crankshaft can handle loads that are similar to higher mass crankshafts. Consequently, a crankshaft with lower rotational inertia to increase engine and vehicle efficiency is provided. Additionally, crankshaft manufacturing cost can be reduced because the crankshaft is made with less material. Further, less machining may be required during crankshaft manufacturing.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

A crankshaft having a reduced number of counterweights for an engine having an odd number of cylinders is provided herein. The crankshaft may include a set of outer pins interposing a central pin coupled to a first and a second counterweight configured to at least partially counteract the forces generated via the outer pins, associated cheeks, and connecting rods coupled to the outer pins. In this way, the weight of the crankshaft can be reduced while retaining fundamental crankshaft design characteristics, such as crankshaft balance. Therefore, the efficiency of the crankshaft may be increased thereby increasing the efficiency of the vehicle without compromising the strength and longevity of the crankshaft.

Figure 1:
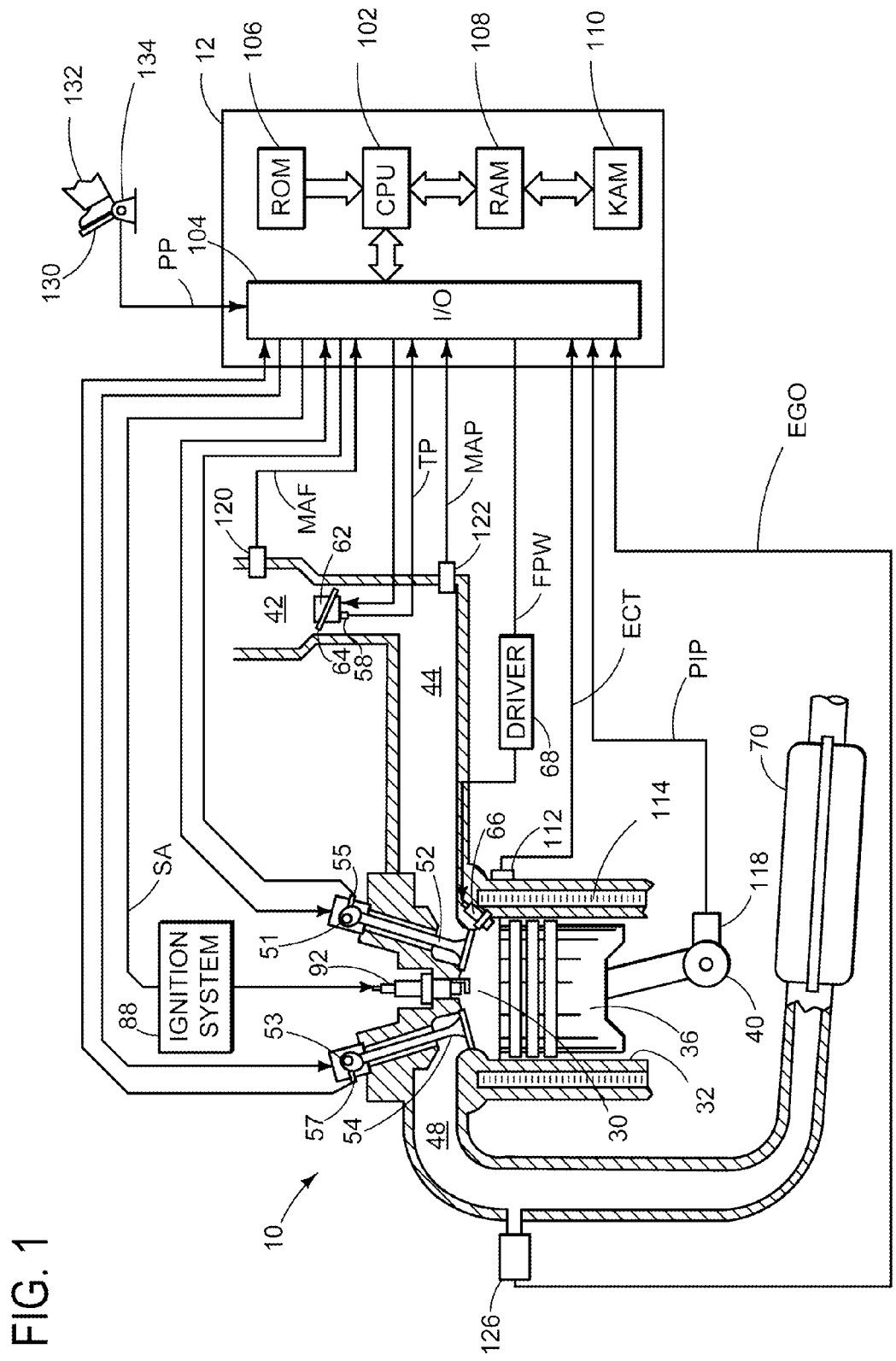
FIGS. 1 and 2 show a schematic depiction of an internal combustion engine.
Figure 2:
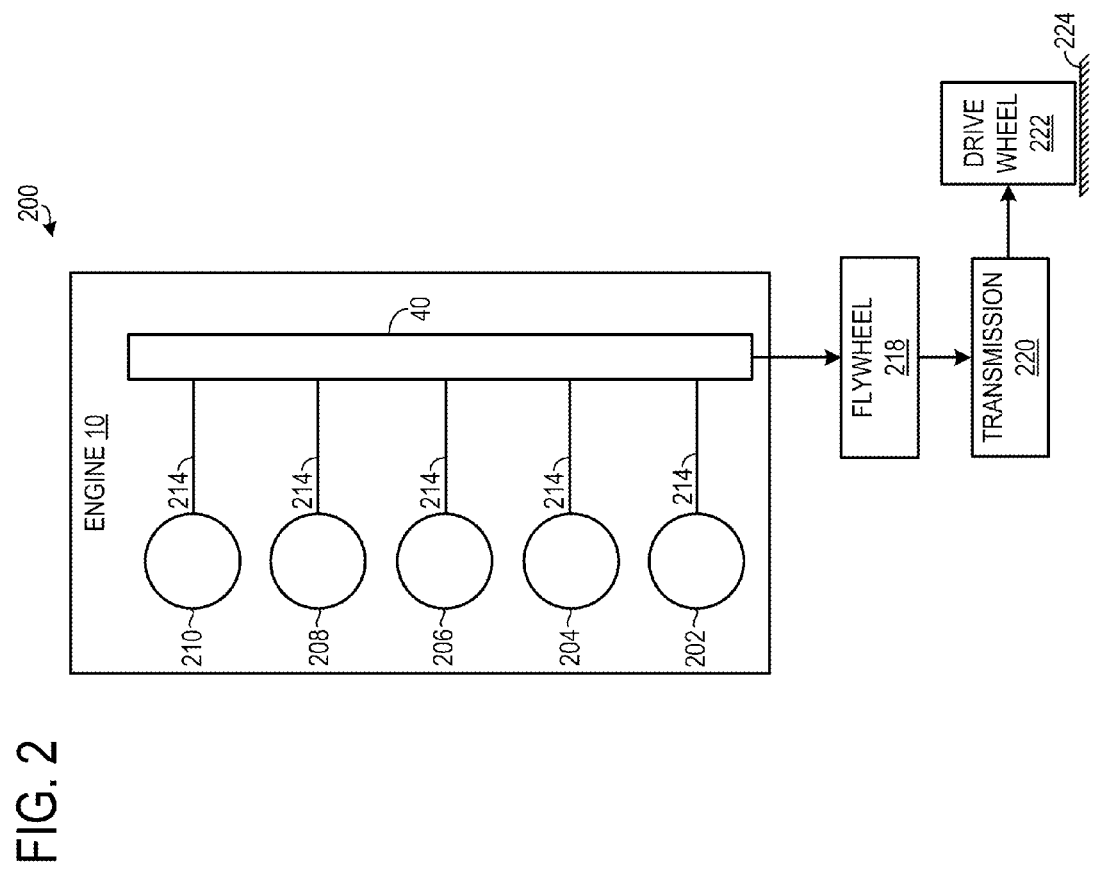
Figure 3:
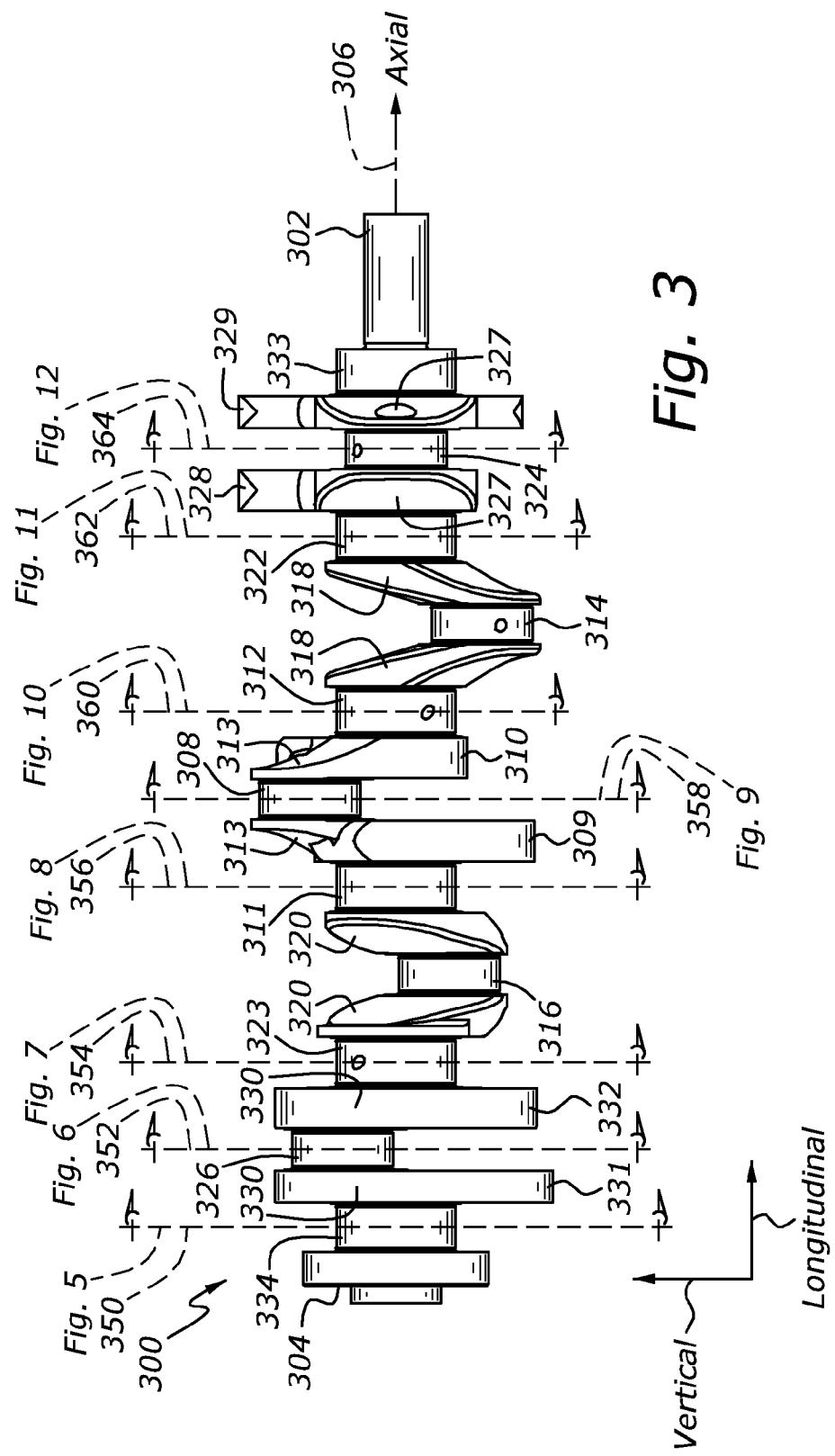
FIG. 3 shows an illustration of a crankshaft for the engine shown in FIGS. 1 and 2 drawn approximately to scale.
Figure 4:
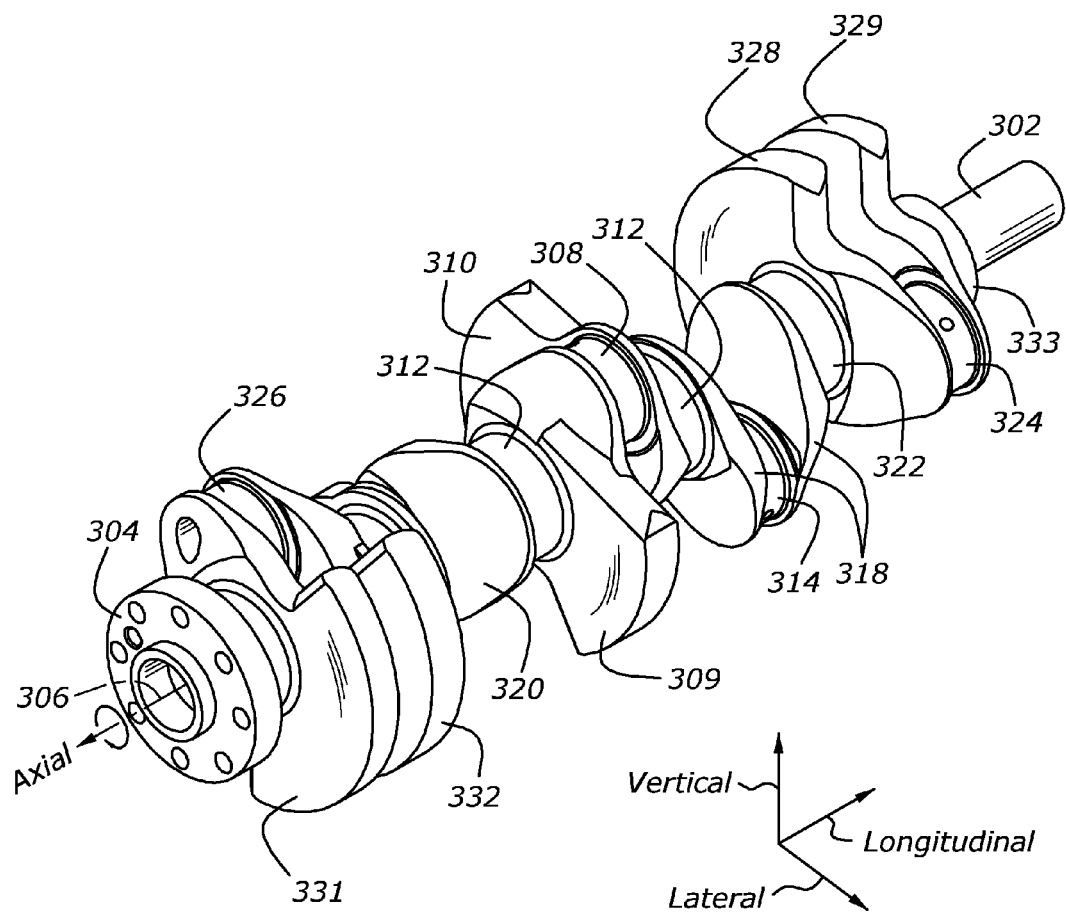
FIG. 4 shows a perspective view of the crankshaft shown in FIG. 3, drawn approximately to scale.

FIG. 1 shows a schematic depiction of an engine and FIG. 2 shows a schematic depiction of a vehicle which includes the engine shown in FIG. 1. FIGS. 3 and 4 show an illustration of an example crankshaft that may be include in the vehicle shown in FIG. 2, according to an embodiment of the present disclosure. FIGS. 5-12 show various cross-sections of the crankshaft illustrated in FIGS. 3 and 4. FIG. 13 shows a schematic illustration of the cheeks and counterweights included in the crankshaft shown in FIG. 3.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Intake manifold 44 is also shown intermediate of intake valve 52 and air intake zip tube 42. Fuel is delivered to fuel injector 66 by a fuel system (not shown) including a fuel tank, fuel pump, and fuel rail (not shown). The engine 10 of FIG. 1 is configured such that the fuel is injected directly into the engine cylinder, which is known to those skilled in the art as direct injection. Fuel injector 66 is supplied operating current from driver 68 which responds to controller 12. In addition, intake manifold 44 is shown communicating with optional electronic throttle 62 with throttle plate 64. In one example, a low pressure direct injection system may be used, where fuel pressure can be raised to approximately 20-30 bar. Alternatively, a high pressure, dual stage, fuel system may be used to generate higher fuel pressures.

Distributorless ignition system 88 provides an ignition spark to combustion chamber 30 via spark plug 92 in response to controller 12. However in other examples, compression ignition may be utilized to ignite an air/fuel mixture in combustion chamber 30. Universal Exhaust Gas Oxygen (UEGO)

sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

In one embodiment, the stop/start crank position sensor has both zero speed and bi-directional capability. In some applications a bi-directional Hall sensor may be used, in others the magnets may be mounted to the target. Magnets may be placed on the target and the "missing tooth gap" can potentially be eliminated if the sensor is capable of detecting a change in signal amplitude (e.g., use a stronger or weaker magnet to locate a specific position on the wheel). Further, using a bi-directional Hall sensor or equivalent, the engine position may be maintained through shut-down, but during re-start alternative strategy may be used to assure that the engine is rotating in a forward direction.

FIG. 2 shows a schematic illustration of a vehicle 200 which may include engine 10, shown in FIG. 1. The engine may include 5 cylinders (202, 204, 206, 208, and 210). The cylinders are in an inline configuration in which the central axis of each cylinder intersects an alignment axis. It will be appreciated that the cylinders may share a single engine block and a crankcase. Although a five cylinder engine is depicted, it will be appreciated that other engines with an odd number of cylinders may be utilized in other embodiments.

Each cylinder includes a reciprocating piston that may be operatively coupled to crankshaft 40 via a respective connecting rod 214. One end of the crankshaft is coupled to a flywheel 218. The flywheel may be used as a storage device for rotational energy. It will be appreciated that two or more bearing may be coupled to the crankshaft to facilitate rotation.

Reduced mass crankshaft 40 may be balanced to reduce the load on the bearing coupled to the crankshaft as well as the noise, vibration, and harshness generated by the crankshaft. As discussed in more detail herein, the number of counterweights may be reduced in the crankshaft when compared to a crankshaft having one or more counterweights corresponding to each engine cylinder and crank-pin. Even though the number of counterweights is reduced, the counter balance of the crankshaft is maintained. In this way, the efficiency of the drive-train may be increased and the weight of the drive-train may be reduced, thereby improving the vehicle's performance and fuel economy. Furthermore, it will be appreciated that the production cost of the drive-train may be decreased by reducing the material needed to forge or cast the crankshaft as well as a reduction in the machining cost of the crankshaft.

As shown, the engine is oriented perpendicularly with respect the axis of rotation of the wheels. In other words, the main inertial axis of the crankshaft may be oriented with the main inertial axis of the transmission. However, in other embodiments alternate orientations are possible. For example, the engine may be parallel to the axis of rotation of the wheels.

During operation, energy may be transferred from the pistons to the crankshaft. Subsequently, the rotational energy from the crankshaft may be transferred to a drive wheel 222 by way of a flywheel 218 and a transmission 220. And, the drive wheel may be in contact with a road surface 224. In this way, the vehicle may be propelled along a road surface. Although a single drive wheel is illustrated it will be appreciated that a plurality of drive wheels may be utilized in other embodiments.

Engine 10 may be configured to initiate combustion within the cylinders in the following order: cylinder 202, cylinder 204, cylinder 208, cylinder 210, and cylinder 206. It will be appreciated that this firing order may decrease engine vibration and fatigue. However, other firing orders may be utilized in other embodiments.

FIG. 3 shows a side view of crankshaft 300. Crankshaft 300 may be crankshaft 40 shown in FIGS. 1 and 2. The crankshaft depicted in FIG. 3 may be utilized in an engine having an inline configuration in which the cylinders are aligned in a single row. In other words, a straight line extends through the center of each cylinder.

The crankshaft includes a front end 302. The crankshaft also includes a back end including a flange 304 configured to attach to flywheel 218. In this way, rotational energy generated via combustion may be transferred to the pistons, crankshaft, flywheel, etc., thereby providing motive power to the vehicle.

The crankshaft rotates about a central axis of rotation 306. The crankshaft further includes a plurality of pins, journals, cheeks, and counterweights. Each journal is aligned with the central axis of rotation 306. The journals couple the cheeks to the counterweights while the pins couple pairs of cheeks and/or counterweights. Each pin is coupled to a piston via a connecting rod (not shown). Each journal may be axially aligned with the central axis of rotation.

Specifically, crankshaft 300 includes a central pin 308 coupling a first counterweight 309 and a second counterweight 310. The first and second counterweights may be referred to as the central pair of counterweights. The first counterweight is coupled to journal 311 and the second counterweight is coupled to journal 312. Journals 311 and 312 may be referred to as a first set of journals. Furthermore, each of the first and second counterweights is asymmetric with respect to a plane radially aligned with a central axis of the central pin and the rotational axis of the crankshaft, discussed in greater detail herein with regard to FIGS. 8 and 9. A central pair of cheeks 313 may be coupled to the central pin 308 and the first and second counterweights (309 and 310). The central pair of cheeks 313 couple journals (311 and 312) to the central pin 308. The central pair of cheeks 313 does not provide any substantial counterbalance to the central pin.

Crankshaft 300 further includes a first set of outer pins. The central pin and corresponding first and second counterweights are interposed via the first set of outer pins. In other words the first and second outer pins bracket the central pin, the first counterweight, and the second counterweight. The first set of outer pins includes a first outer pin 314 and a second outer pin 316. The first outer pin 314 and the second outer pin 316 are substantially equidistantly spaced in the axial direction from the central pin. In other words, each pin in the first set of outer pins is axially equidistant from central pin 308. The first outer pin 314 is coupled to a pair of corresponding cheeks 318. Similarly the second outer pin 316 is coupled to a pair of corresponding cheeks 320. The innermost cheek included in the pair of cheeks 318 is journals 312. Likewise, the innermost cheek included the pair of cheeks 320 is coupled to journal 311. Additionally, the outermost cheek included in the pair of cheeks 318 is coupled to journal 322 and the outermost cheek included in the pair of cheeks 320 is coupled to journal 323. Journals 322 and 323 may be referred to as a second set of journals. It will be appreciated that the pairs of cheeks 318 and 320 do not provide any substantial counterbalance to the first and second outer pins. That is to say that the cheeks directly coupled to the first set of outer pins do not counterbalance the first set of outer pins. In other words the pairs of cheeks 318 and 320 are absent counterweights. It will be appreciated that in some embodiments the pairs of cheeks directly coupled to the first and second outer pins are similar in size and geometry.

Crankshaft 300 further includes a second set of outer pins. The first set of outer pins is interposed by the second set of outer pins. The second set of outer pins includes a third outer pin 324 and a fourth outer pin 326. The third outer pin 324 and the fourth outer pin 326 are substantially equidistantly spaced in the axial direction from the central pin. A pair of cheeks 327 is coupled to the third out pin 324. Additionally, a third counterweight 328 and a fourth counterweight 329 are coupled to the pair of cheeks 327. Likewise, a pair of cheeks 330 is coupled to the fourth outer pin 326. Additionally, a fifth counterweight 331 and a sixth counterweight 332 are coupled to the pair of cheeks 330. The third counterweight 328 is coupled to journal 322. The fourth counterweight 329 is coupled to journal 333. The fifth counterweight 331 is coupled to journal 334 and the sixth counterweight 332 is coupled to journal 323. Journals 333 and 334 may be referred to as a third set of journals. Cutting plane 350 defines the cross-section shown in FIG. 5. The axial distance between cutting plane 350 and journal 333 adjacent to front end 302 may be 414 millimeters (mm). Cutting plane 352 defines the cross-section shown in FIG. 6. The axial distance between cutting plane 352 and journal 333 adjacent to front end 302 may be 378.25 mm. Cutting plane 354 defines the cross-section shown in FIG. 7. The axial distance between cutting plane 354 and journal 333 adjacent to front end 302 may be 331.5 mm. Cutting plane 356 defines the cross-section shown in FIG. 8. The axial distance between cutting plane 356 and journal 333 adjacent to front end 302 may be 244.5 mm. Cutting plane 358 defines the cross-section shown in FIG. 9. The axial distance between cutting plane 358 and journal 333 adjacent to front end 302 may be 204.25 mm. Cutting plane 360 defines the cross-section shown in FIG. 10. The axial distance between cutting plane 360 and journal 333 adjacent to front end 302 may be 157.1 mm. Cutting plane 362 defines the cross-section shown in FIG. 11. The axial distance between cutting plane 362 and journal 333 adjacent to front end 302 may be 70.5 mm. Cutting plane 364 defines the cross-section shown in FIG. 12. The axial distance between cutting plane 364 and journal 333 adjacent to front end 302 may be 30.24 mm.

Two or more bearings (not shown) may also be coupled to crankshaft 300. In particular, a bearing may be coupled to each end of the crankshaft. Additionally, in some examples, each journal may be coupled to an associated bearing. However, other bearing configurations may be used in other examples.

Figure 5:
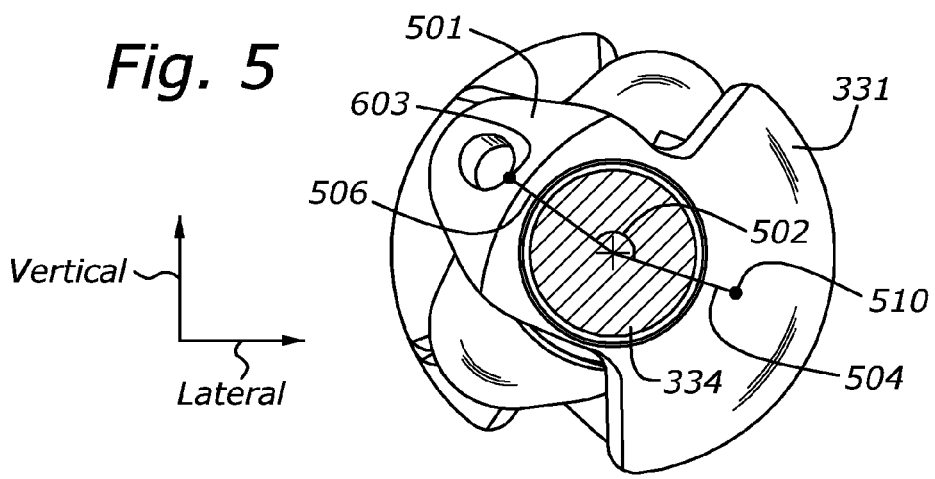
FIGS. 5-12 show various cross-sectional side views of the pins, cheeks, and counterweights included in the crankshaft shown in FIG. 3 drawn approximately to scale.
Figure 6:
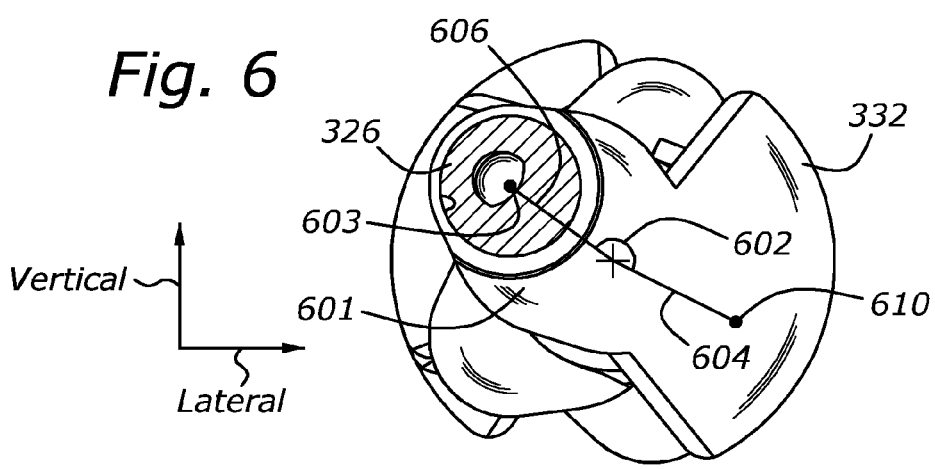

FIG. 4 illustrates a perspective view of crankshaft 300. The pins included in the crankshaft (e.g., the central pin 308, the first outer pin 314, the second outer pin 316, the third outer pin 324, and the fourth outer pin 326) may be distributed at angular intervals of 72°. FIGS. 5 and 6 show a side view of the fifth counterweight 331, the sixth counterweight 332, and the fourth outer pin 326. The fifth counterweight 331 is coupled to journal 334 and cheek 501. The fourth outer pin 326 and journal 334 are also coupled to cheek 501. Additionally, the sixth counterweight 332 is coupled to journal 333 and cheek 601. It will be appreciated that the second counterweight is adjacent to the second outer pin 316. The fourth outer pin 326 and journal 333 are also coupled to cheek 601. Cheeks 501 and 601 are included in the pair of cheeks 330 shown in FIG. 3. Each of the fifth and sixth counterweights (331 and 332) is asymmetric with respect a plane radially aligned with the central axis 603 of pin 326 and the rotational axis of the crankshaft. The center of mass of the fifth counterweight is labeled 510 and the center of mass of the sixth counterweight is labeled 610. The asymmetry of the sixth counterweight 332 enables the counterweight to counteract the forces generated by rotation of multiple pins (e.g., the second outer pin 316 and the fourth outer pin 326), discussed in greater detail herein.

Furthermore, the fifth counterweight 331 and the sixth counterweight 332 are dissimilar in geometry and radial position. The radial position of the counterweights may be characterized by the separation angle defined by the three following points positioned in a vertically and laterally oriented plane. The first point being a point on the crankshaft's rotational axis, the second point being a point on the central axis of the pin coupled to the counterweight, and the third point being the center of mass of the counterweight. It will be appreciated that the separation angle is one way to measure the center of mass of the counterweights with respect to the rotational axis of the crankshaft. As shown, the separation angle 502 of the fifth counterweight 331 is 161.9°. Furthermore, the length of line segment 504 may be 44.9 mm. However, line segment 504 and separation angle 502 may have other values in other examples. Line segment 504 is radially aligned and extends from the central rotational axis of the crankshaft to the center of mass 510 of the fifth counterweight 331. Therefore, line segment 504 is in a laterally and vertically aligned plane. Additionally, separation angle 602 of counterweight 332 is 170.5°. Furthermore, the length of line segment 604 may be 47.6 mm. However, line segment 604 and separation angle 602 may have other values in other examples. Line segment 604 is radially aligned and extends from the central rotational axis of the crankshaft to the center of mass 610 of the sixth counterweight 332. Therefore, line segment 604 is in a vertically and laterally aligned plane.

Furthermore, line segment 506 may have a length of 42.5 mm. Other lengths may be utilized on other embodiments. Line segment 506 radially extends from the central rotational axis of the crankshaft to the central axis of pin 326, and is herein referred to as the throw. The throw for each pin is identical. Thus, line segments 606, 806, 906, 1106, and 1206, illustrated in FIGS. 6, 8, 9, 11, and 12, are equal in length to line segment 506.

It will be appreciated that the mass and the position of the center of mass of each of the fifth and sixth counterweights (331 and 332) may be configured to at least partially counteract the forces generated by rotation of the first and second outer pins (314 and 316) and corresponding cheeks (318 and 320). In this way, the first and second counterweights are positioned and weighted to at least partially counteract forces generated by rotation of the first set of outer pins and the corresponding pairs of cheeks. In this particular embodiment, the sixth counterweight 332 counteracts the forces generated by rotation of the second outer pin 316 and the fifth counterweight 331 does not provide any substantial counterbalance to the second outer pin 316. Additionally, the fifth counterweight 331 and the sixth counterweight 332 provide counterbalance to forces generated by rotation of the fourth outer pin 326.

Figure 7:
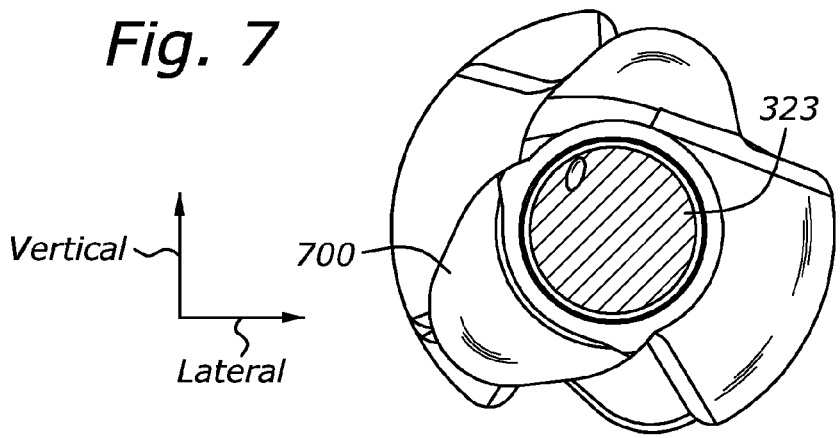

FIG. 7 shows a cross-sectional side view of one of the journals 323 and a cheek 700 included in the pair of cheeks 320. It will be appreciated that cheek 700 is coupled to the second outer pin 316. Additionally, another cheek may be coupled to the second outer pin similar in geometry and radial orientation to cheek 700.

Figure 8:
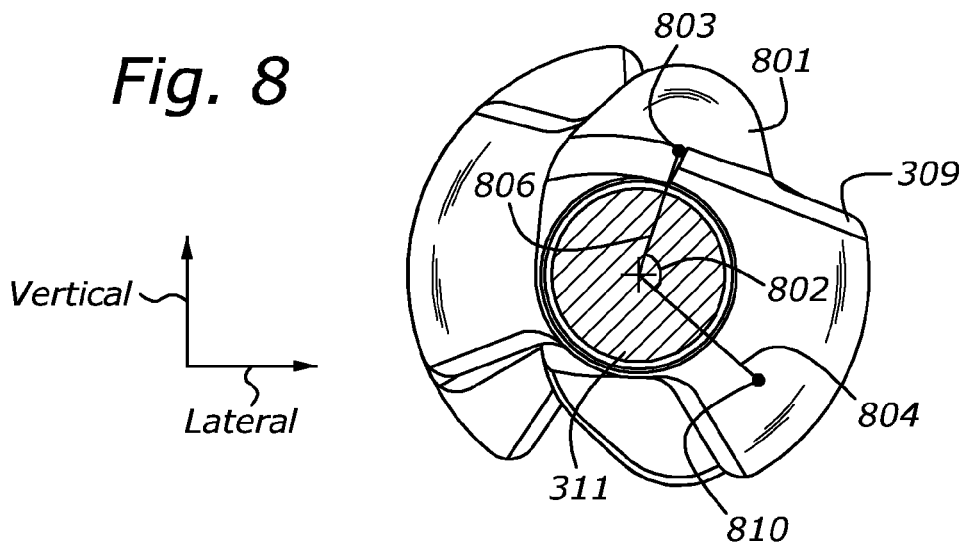

FIG. 8 shows a cross-sectional side view of the first counterweight 309. Cheek 801 is coupled to journal 311 and the central pin 308. The first counterweight 309 is coupled to journal 311 and cheek 801. It will be appreciated that the first counterweight 309 is adjacent to the second outer pin 316. As shown, the separation angle 802 between the center of mass 810 of the first counterweight and the central axis 803 of the central pin is 113.3°. However, it will be appreciated that other non-straight angles may be utilized. As previously discussed, the separation angle may be the separation angle defined by the following three points positioned on a vertically and laterally oriented plane. The first point being a point on the crankshaft's rotational axis, the second point being a point on the central axis of the pin coupled to the counterweight, and the third point being the center of mass of the counterweight. Line segment 804 has a length of 53.5 mm. However, line segment 804 may have another value in other examples. Line segment 804 is radially aligned and extends from the central rotational axis of the crankshaft to the center of mass 810 of the first counterweight 309. Therefore, line segment 804 is in a vertically and laterally aligned plane.

Figure 9:
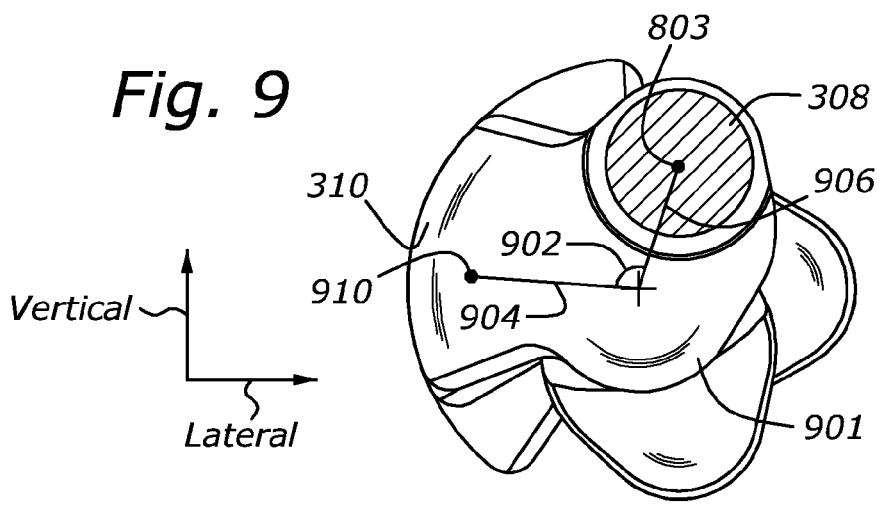

FIG. 9 shows a cross-sectional side view of the second counterweight 310. Cheek 901 is coupled to journal 312 and the central pin 308. Cheek 801 and 901 are included in the pair of cheeks 313 shown in FIG. 3. The second counterweight 310 is coupled to journal 312 and cheek 901. It will be appreciated that the second counterweight 310 is adjacent to the first outer pin 314. It will be appreciated that neither cheek 801 nor cheek 901 provides any substantial counterbalance to the forces generated by rotation of the central pin 308.

As shown, the separation angle 904 between the center of mass of the counterweight and the central axis 803 of the central pin is 103.7°. Line segment 904 has a length of 53.7 mm. However, line segment 904 may have another length in other examples. Furthermore, separation angle may be another non-straight angle in other examples. Line segment 904 is radially aligned and extends from the central rotational axis of the crankshaft to the center of mass 910 of the second counterweight 310. Therefore, line segment 904 is in a vertically and laterally aligned plane.

It will be appreciated that the mass and the position of the center of mass of each of the first and second counterweights (309 and 310 respectively) may be configured to at least partially counteract the forces generated by the rotation of the first set of outer pins and corresponding connecting rods and cheeks. In particular, the first counterweight 309 partially counteracts the forces generated by rotation of the second outer pin 316, and the second counterweight 310 partially counteracts the forces generated by rotation of the first outer pin 314. In this way, the third and fourth counterweights are positioned and weighted to at least partially counteract forces generated by rotation of the first set of outer pins and the first pair of cheeks. However, in other examples, the second counterweight 310 may partially counteract the forces generated by rotation of the second outer pin 316, and the first counterweight 309 may partially counteract the forces generated by rotation of the first outer pin 314. Further, in other examples the first and second counterweights (309 and 310) may both counteract the forces generated by rotation of the first outer pin 314 as well as the second outer pin 316. In this way, the mass of the crankshaft is reduced while maintaining balance within the crankshaft. Furthermore, the first and second counterweights (309 and 310) substantially counteract the forces generated by rotation of the central pin 308 and cheeks 801 and 901. The counterbalancing within crankshaft 300 is discussed in greater detail herein with regard to FIG. 13.

Figure 10:
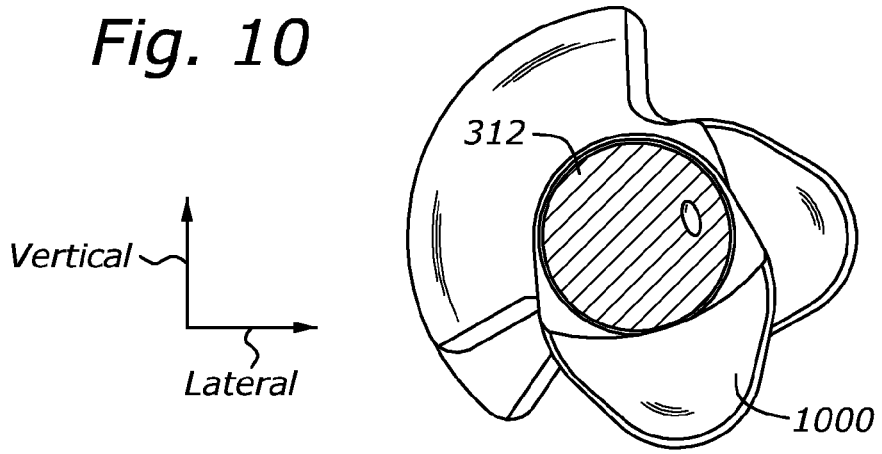

FIG. 10 shows a cross-sectional side view of one of the journal 312 and an outermost cheek 1000 included in the pair of cheeks 318. It will be appreciated that cheek 1000 is coupled to the first outer pin 314. Additionally, another cheek is coupled to the second outer pin that is substantially identically in geometry and radial orientation to cheek 1000.

Figure 11:
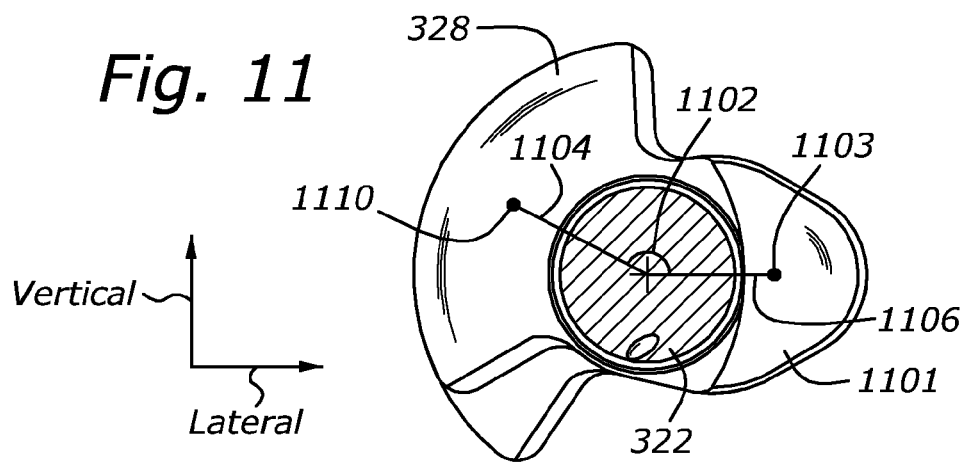
Figure 12:
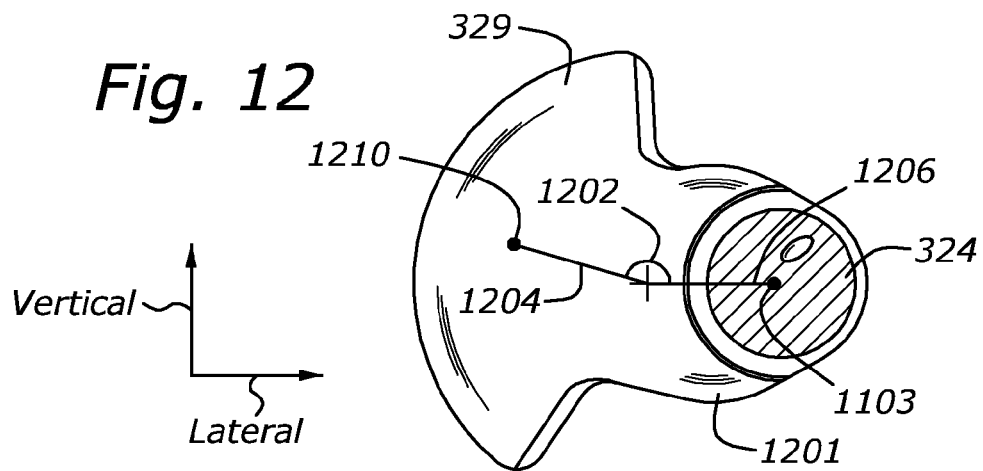
Figure 13:
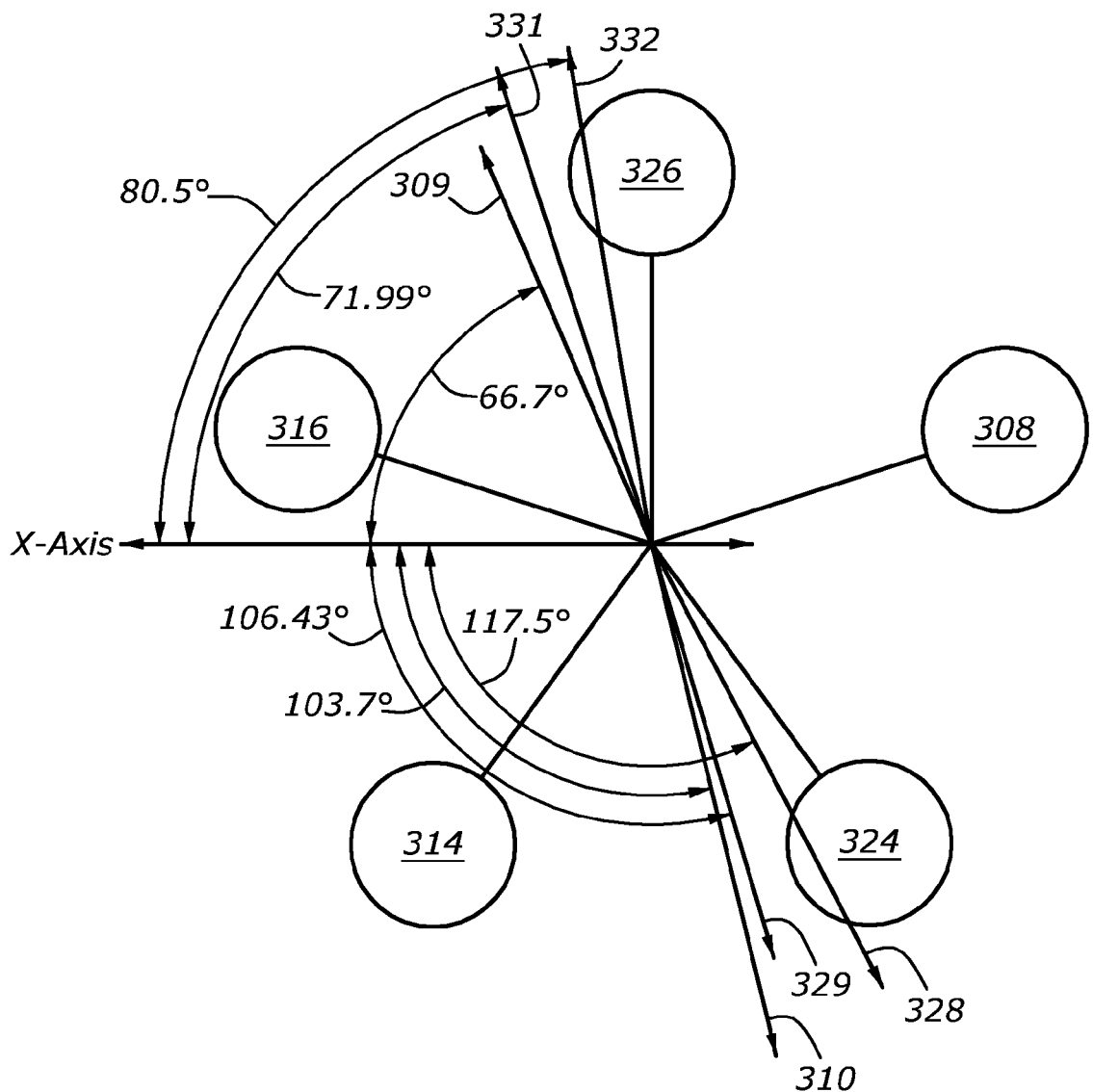
FIG. 13 illustrates a diagram depicting the counterbalancing within the crankshaft shown in FIG. 3.

FIGS. 11 and 12 show a side view of the third counterweight 328, the fourth counterweight 329, and the third outer pin 324. Cheek 1101 is coupled to journal 322 and the third outer pin 324. The third counterweight 328 is coupled to cheek 1101 and journal 322. Cheek 1201 is coupled to journal 333 and the third outer pin 324. Additionally, the fourth counterweight 329 is coupled to cheek 1201 and journal 333. Cheek 1101 and 1201 are included in the pair of cheeks 327 shown in FIG. 3.

The third counterweight 328 and the fourth counterweight 329 are both asymmetric with respect to a plane radially aligned with a central axis 1103 of pin 324 and the rotational axis of the crankshaft. The center of mass of the third counterweight 1100 is labeled 1110 and the center of mass of the fourth counterweight is labeled 1210. Furthermore, the third counterweight 328 and the fourth counterweight 329 are dissimilar in geometry and radial position. The radial position of the counterweights may be characterized by a separation angle defined by the three following points positioned in a vertically and laterally oriented plane. The first point being a point on the crankshaft's rotational axis, the second point being a point axially aligned with the center of the pin coupled to the counterweight, and the third point being the center of mass of the counterweight. As shown, the separation angle 1102 of counterweight 1100 is 152.5°. Furthermore, the length of line segment 1104 may be 48.6 mm. However, line segment 1104 and separation angle 1102 may have other values in other examples. Line segment 1104 is radially aligned and extends from the central rotational axis of the crankshaft to the center of mass 1110 of the third counterweight 328. Therefore, line segment 1104 is in a laterally and vertically aligned plane. Additionally, separation angle 1202 of the fourth counterweight 329 is 163.6°. Furthermore, the length of line segment 1204 may be 44.4 mm. However, line segment 1204 and separation angle 1202 may have other values in other examples. Line segment 1204 is radially aligned and extends from the central rotational axis of the crankshaft to the center of mass 1210 of the fourth counterweight 329. Therefore, line segment 1204 is in a vertically and laterally aligned plane.

It will be appreciated that the mass and the position of the center of mass of each of the third and fourth counterweights (328 and 329) may be configured to at least partially counteract the forces generated by rotation of the first and second outer pins (314 and 316) corresponding cheeks (318 and 320), and corresponding connecting rods. In particular, the third counterweight 328 may partially counteract the forces generated by rotation of the first outer pin 314. In this example, the fourth counterweight 329 may not provide any substantial counterbalance to the forces generated by rotation of the first outer pin 314. However, in other examples the fourth counterweight 329 may provide some counterbalance to the forces generated by rotation of the first outer pin 314. Furthermore, the third and fourth counterweights (328 and 329) may counteract the forces generated by rotation of the third outer pin 324.

FIG. 13 shows a diagram depicting the counterbalancing within crankshaft 300 viewed in the axial direction. The arrows represent the direction and magnitude of the counterweights within the crankshaft and the pins are provided for reference. The arrows are labeled with the numbers of the counterweight to which they correspond. As shown, the separation angle between the first counterweight 309 and the second counterweight 310 is 170.4°. The separation angle between the fifth counterweight 331 and the fourth counter weight 329 is 178.36°. The separation angle between the sixth counterweight 332 and the third counterweight 328 is 198°. It will be appreciated that other values for the aforementioned separation angles may be utilized in other examples.

The first counterweight 309 and the sixth counterweight 332 may both counteract the forces generated by rotation of the second outer pin 316. In this example, the first counterweight 309 and the sixth counterweight 332 both counteract a substantially equal amount of the forces generated by rotation of the second outer pin 316. However, in other examples the first counterweight 309 may counteract a greater amount of the forces generated by rotation of the second outer pin 316 than the sixth counterweight 332. Still further, in other examples the sixth counterweight 332 may counteract a greater amount of the forces generated by rotation of the second outer pin 316 than the first counterweight 309.

Likewise, the second counterweight 310 and the third counterweight 328 counteract the forces generated via rotation of the first outer pin 314. In this example, the second counterweight 310 and the third counterweight 328 may both counteract a substantially equal amount of the forces generated by rotation of the first outer pin 314. However, in other examples the second counterweight 310 may counteract a greater amount of the forces generated by rotation of the first outer pin 314 than the third counterweight 328. Still further, in other examples the third counterweight 328 may counteract a greater amount of the forces generated by rotation of the first outer pin 314 than the first counterweight 310. In this way, the counterweights that are adjacent to the first and second outer pins may counteract the forces generated by rotation of the pins.

The crankshaft design described above enables forces generated by rotation of the pins in the crankshaft to be balanced while at the same time reducing the weight of the crankshaft when compared to a crankshaft having two or more counterweights corresponding to each pin and therefore cylinder. Consequently, the efficiency of the drive-train may be reduced via the reduction in crankshaft mass due to the reduction in rotational inertia of the crankshaft, increasing the vehicle's efficiency.

It will be appreciated that the configurations and/or approaches described herein are exemplary in nature, and that these specific embodiments or examples are not to be considered in a limiting sense, because numerous variations are possible. The subject matter of the present disclosure includes all novel and nonobvious combinations and subcombinations of the various features, functions, acts, and/or properties disclosed herein, as well as any and all equivalents thereof.

The invention claimed is:

1. A crankshaft for an engine, comprising:
   a central pin directly coupling a first counterweighted cheek to a second counterweighted cheek, the first and second counterweighted cheeks being asymmetric on reflection in a plane orthogonal to a rotation axis of the crankshaft and passing between the first and second counterweighted cheeks;
   a first outer pin arranged forward of the central pin in a direction parallel to the rotation axis, the first outer pin directly coupling a first pair of non-counterweighted cheeks; and
   a second outer pin arranged rearward of the central pin in the direction parallel to the rotation axis, the second outer pin directly coupling a second pair of non-counterweighted cheeks,
   where a total number of crankpins of the crankshaft, including the first and second outer pins and the central pin, is an odd number.

2. The crankshaft of claim 1 further comprising:
   a third outer pin arranged forward of the first outer pin in the direction parallel to the rotation axis, the third outer pin directly coupling a third counterweighted cheek to a fourth counterweighted cheek; and
   a fourth outer pin arranged rearward of the second outer pin in the direction parallel to the rotation axis, the fourth outer pin directly coupling a fifth counterweighted cheek to a sixth counterweighted cheek,
   wherein each of the third, fourth, fifth, and sixth counterweighted cheeks includes a corresponding counterweight.

3. The crankshaft of claim 2 wherein a center of mass of the third counterweight and a center of mass of the fourth counterweight lie at different distances from the rotation axis, and wherein a center of mass of the fifth counterweight and a center of mass of the sixth counterweight lie at different distances from the rotation axis.

4. The crankshaft of claim 2 wherein the engine is configured such that a cylinder associated with the third outer pin fires before a cylinder associated with the first outer pin, which fires before a cylinder associated with the second outer pin, which fires before a cylinder associated with the fourth outer pin, which fires before a cylinder associated with the central pin.

5. The crankshaft of claim 1 wherein the odd number is a total number of cylinders of the engine, and wherein the cylinders are arranged in an in-line configuration.

6. The crankshaft of claim 1 wherein a different crankpin is provided for each cylinder of the engine.

7. The crankshaft of claim 1 wherein the first counterweighted cheek includes a first counterweight, and the second counterweighted cheek includes a second counterweight.

8. The crankshaft of claim 7 wherein a center of mass of the first counterweight and a center of mass of the second counterweight lie at different distances from the rotation axis.

9. The crankshaft of claim 7 wherein an angle drawn in a bisecting plane of the first counterweight, from a center of mass of the first counterweight to the rotation axis and then to a symmetry axis of the central pin, is less than 180 degrees.

10. The crankshaft of claim 9 wherein the angle is between 170 and 171 degrees.

11. The crankshaft of claim 7 wherein the first counterweight at least partially counterbalances the first outer pin, and wherein the second counterweight at least partially counterbalances the second outer pin.

12. A crankshaft for an engine having an odd number of cylinders in an in-line configuration, the crankshaft comprising:
a central pin directly coupling a first counterweighted cheek to a second counterweighted cheek, the first and second counterweighted cheeks being asymmetric on reflection in a plane orthogonal to a rotation axis of the crankshaft and passing between the first and second counterweighted cheeks;
a first outer pin arranged forward of the central pin in a direction parallel to the rotation axis, the first outer pin directly coupling a first pair of non-counterweighted cheeks; and
a second outer pin arranged rearward of the central pin in the direction parallel to the rotation axis, the second outer pin directly coupling a second pair of non-counterweighted cheeks;
wherein the first counterweighted cheek includes a first counterweight, and the second counterweighted cheek includes a second counterweight;
wherein a center of mass of the first counterweight and a center of mass of the second counterweight lie at different distances from the rotation axis; and
wherein the first and second counterweights at least partially counterbalance the first and second outer pins and corresponding pairs of non-counterweighted cheeks.

13. The crankshaft of claim 12, further comprising:
a third outer pin arranged forward of the first outer pin in the direction parallel to the rotation axis, the third outer pin directly coupling a third counterweighted cheek to a fourth counterweighted cheek; and
a fourth outer pin directly coupling a fifth counterweighted cheek to a sixth counterweighted cheek;
wherein the third, fourth, fifth, and sixth counterweighted cheeks each include a corresponding counterweight positioned and weighted to at least partially counterbalance the first and second outer pins and corresponding pairs of non-counterweighted cheeks.

14. The crankshaft of claim 13, wherein the first and third counterweights substantially counterbalance the first outer pin and the first pair of non-counterweighted cheeks, and wherein the second and fifth counterweights substantially counterbalance the second outer pin and the second pair of non-counterweighted cheeks.

15. The crankshaft of claim 13 wherein the third and fourth counterweighted cheeks are asymmetric on reflection in a plane orthogonal to the rotation axis of the crankshaft and passing between the third and fourth counterweighted cheeks, and wherein the fifth and sixth counterweighted cheeks are asymmetric on reflection in a plane orthogonal to the rotation axis of the crankshaft and passing between the fifth and sixth counterweighted cheeks.

16. The crankshaft of claim 13 wherein an angle drawn in a plane passing between the first counterweight and the second counterweight, from a center of mass of the first counterweight to the rotation axis and then to a center of mass of the second counterweight, is substantially 113.3 degrees.

17. The crankshaft of claim 13 wherein the third outer pin, the first outer pin, the central pin, the second outer pin, and the fourth outer pin are separated by intervals of 72 degrees with respect to the rotation axis.

18. The crankshaft of claim 13 wherein the first and second pins are substantially equidistant from the central pin.

19. A crankshaft for an engine having five cylinders in an in-line configuration, the crankshaft comprising:
a central pin directly coupling a first counterweighted cheek to a second counterweighted cheek, the first and second counterweighted cheeks being asymmetric on reflection in a plane orthogonal to a rotation axis of the crankshaft and passing between the first and second counterweighted cheeks;
a first outer pin arranged forward of the central pin in a direction parallel to the rotation axis, the first outer pin directly coupling a first pair of non-counterweighted cheeks; and
a second outer pin arranged rearward of the central pin in the direction parallel to the rotation axis, the second outer pin directly coupling a second pair of non-counterweighted cheeks;
a first journal arranged along the rotation axis, between the first counterweighted cheek and the first pair of non-counterweighted cheeks; and
a second journal arranged along the rotation axis, between the second counterweighted cheek and the second pair of non-counterweighted cheeks;
wherein the first counterweighted cheek includes a first counterweight, and the second counterweighted cheek includes a second counterweight;
wherein a center of mass of the first counterweight and a center of mass of the second counterweight lie at different distances from the rotation axis; and
wherein the first and second counterweights at least partially counterbalance the first and second outer pins and corresponding pairs of non-counterweighted cheeks.

20. The crankshaft of claim 19 further comprising:
a third outer pin arranged forward of the first outer pin in the direction parallel to the rotation axis, the third outer pin directly coupling a third counterweighted cheek to a fourth counterweighted cheek; and
a fourth outer pin arranged rearward of the second outer pin in the direction parallel to the rotation axis, the fourth outer pin directly coupling a fifth counterweighted cheek to a sixth counterweighted cheek, the central pin and the first and second outer pins located between the third and fourth outer pins, wherein the third counterweighted cheek includes a third counterweight and the fifth counterweighted cheek includes a fifth counterweight, and wherein the first and third counterweights substantially counterbalance the first outer pin and corresponding pair of non-counterweighted cheeks, and wherein the second and fifth counterweights substantially counterbalance the second outer pin and corresponding pair of non-counterweighted cheeks.

21. The crankshaft of claim 19, where the first and second counterweights differ in mass.

* * * * *